United States Patent [19]

Hubbard

[11] Patent Number: 4,542,272

[45] Date of Patent: Sep. 17, 1985

[54] INDUCTION HEATING DEVICE WITH ELECTRONIC POSITIONING CONTROL

[75] Inventor: Kenneth G. Hubbard, Merseyside, England

[73] Assignee: The Cross Company, Fraser, Mich.

[21] Appl. No.: 582,290

[22] Filed: Feb. 22, 1984

Related U.S. Application Data

[63] Continuation-in-part of Ser. No. 425,988, Sep. 28, 1982, abandoned.

[51] Int. Cl.[4] ............................................. H05B 6/10
[52] U.S. Cl. .............................. 219/10.57; 219/10.43; 219/10.77; 219/10.79; 266/92; 266/129
[58] Field of Search ............... 219/10.43, 10.41, 10.57, 219/10.79, 10.69, 10.71, 10.77, 10.75, 518; 340/686, 688; 266/90, 92, 129

[56] References Cited

U.S. PATENT DOCUMENTS

| 3,716,690 | 2/1973 | Bryant | 266/92 X |
| 3,743,809 | 7/1973 | Delpaggio | 219/10.57 |
| 4,266,109 | 5/1981 | Ciolkevich | 219/10.57 |

FOREIGN PATENT DOCUMENTS 2454667  5/1976  Fed. Rep. of Germany .

Primary Examiner—Philip H. Leung
Attorney, Agent, or Firm—Cyril M. Hajewski; John R. Benefiel

[57] ABSTRACT

An induction heating apparatus particularly adapted for precisely positioning the inductor relative to the workpiece before initiating the heating process. The inductor is mounted on the end of an inductor shaft that is carried by a slide. The end of the shaft opposite the inductor is connected to a coupling that couples the shaft to a stepping motor. The slide moves the inductor into engagement with the workpiece and the stepping motor is then energized to move the inductor away from the workpiece the required amount to obtain the desired spacing.

9 Claims, 3 Drawing Figures

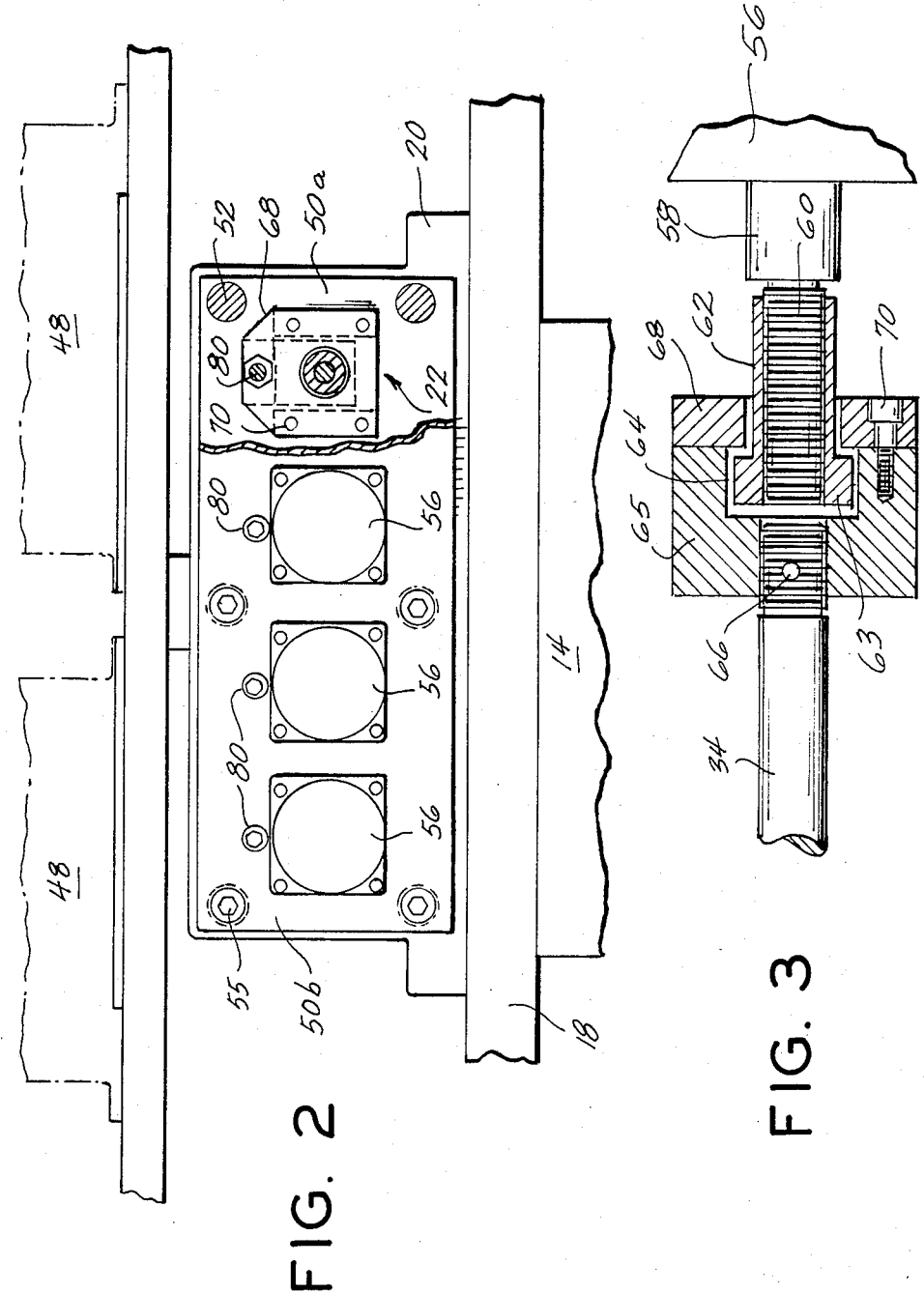

INDUCTION HEATING DEVICE WITH ELECTRONIC POSITIONING CONTROL

BACKGROUND OF THE INVENTION

This is a continuation-in-part of application Ser. No. 425,988, filed Sept. 28, 1982 now abandoned.

This invention relates generally to induction heating apparatus and more particularly to an improved induction heating apparatus having a positioning control for assuring optimal spacing between the inductor and the workpiece during the heating cycle.

To obtain longer and more economical operation of internal combustion engines and particularly those internal combustion engines operating on fuel having a reduced lead content, the engine valve seats are hardened. Without hardening of the valve seats, the very high temperature exhaust gas expelled through the cylinder valves causes the valve seats to wear excessively, reducing the engine life time. The most common method of increasing the hardness of internal combustion engine valve seats is to heat the valve seat to a very high temperature and then to quench it with a cooling fluid. To accomplish such high temperature heating of the internal combustion engine valve seats, inductive heating devices are commonly employed.

A typical induction heating device employed for inductively heating internal combustion engine valve seats comprises an inductor having a configuration complementary to the valve seat. When the inductor is brought into operative relationship with the valve seat, a high frequency alternating current is applied to the inductor, causing the inductor to generate a time varying magnetic field which is induced into that portion of the engine block surrounding the valve seat. The circulating eddy currents generated by the magnetic field induced in the engine block encounter high resistive losses causing valve seat heating. In practice, optimal magnetic coupling between the inductor and the valve seat is achieved when the inductor is separated by a small but finite air gap from the valve seat. The spacing of this air gap is critical, since a very large air gap results in poor magnetic coupling and hence poor heating, while too close a gap distance between the inductor and the valve seat results in uneven valve seat heating. In practice, a gap of 0.5–1.0 mm is usually satisfactory.

In the past, achieving the proper air gap distance between the inductor and the engine block valve seat has been accomplished by spring biasing the inductor on a frame which is slidably mounted on a platform for reciprocal movement to and from the engine block along the axis of the inductor. The frame and the inductor are biased toward the workpiece to bring the inductor into contact with the engine block valve seat after which time the inductor is locked to the frame and the frame and the inductor are displaced away from the engine block a pre-set air gap distance so that the inductor is separated from the engine block valve seat by the desired air gap distance. While such prior art induction heating devices are satisfactory to achieve hardening of internal combustion engine valve seats, they are nevertheless subject to the drawback that the entire frame must be retracted from the workpiece to achieve the desired spacing between the inductor and the engine block valve seat, thereby increasing the likelihood of imprecise inductor-workpiece separation.

It is therefore an object of the present invention to provide an improved induction heating apparatus for hardening internal combustion engine valve seats in which the spacing between the inductor and the engine block valve seat can be controlled precisely.

It is another object of the present invention to provide an improved induction heating apparatus for hardening internal combustion engine valve seats which achieves precise inductor positioning relative to the engine block valve seat by accurately controlling the displacement of the inductor relative to the inductor support.

SUMMARY OF THE INVENTION

An induction heating apparatus particularly adapted to precisely position the induction element relative to the valve seat of an engine block before initiating the heating process. The apparatus includes a base supporting a slide for movement in a rectilinear path of travel. An inductor shaft is carried by the slide for limited axial movement and carries the inductor at one end. A spring urges the inductor shaft toward the workpiece. The opposite end of the shaft is connected to a coupling that couples the shaft to an actuator. The slide moves the inductor into engagement with the workpiece and overtravels slightly to cause the inductor shaft to move relative to the slide against the pressure of the spring. This disengages the shaft from the coupling creating a gap between the inductor shaft and the coupling. This gap is measured by a measuring instrument and data representing the size of this gap is transmitted to a control. The latter then causes energization of a stepping motor to move the coupling an amount sufficient to close the gap and reengage the inductor shaft with the coupling. The stepping motor then continues to operate to move the coupling and thereby the inductor shaft and its associated induction element the required amount to obtain the desired spacing of the induction element from the surface of the valve seat.

BRIEF DESCRIPTIN OF THE DRAWINGS

The features of the invention believed to be novel are set forth with particularity in the appended claims. The invention itself, however, both as to organization and method of operation, together with further objects and advantages thereof may best be understood by reference to the following description taken in conjunction with the accompanying drawings in which:

FIG. 2 is a view taken along the plane represented by the line 2—2 of FIG. 1 with a portion broken away to show the coupling structure; and FIG. 3 is an enlarged detail sectional view of a portion of the induction heating machine of FIG. 1.

DETAILED DESCRIPTION OF THE PREFERRED EMBODIMENT

Figure 1:
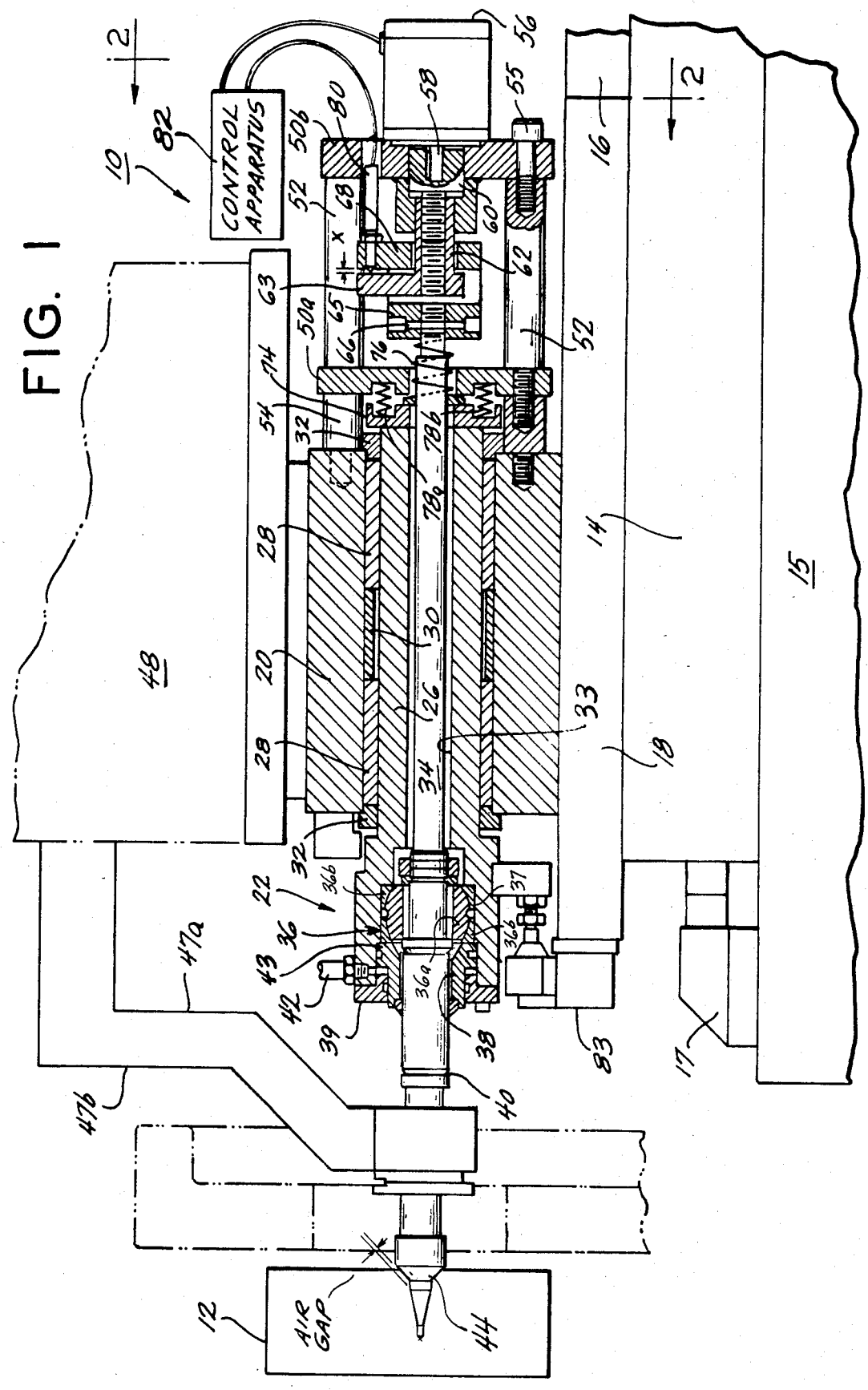
FIG. 1 is a cross-sectional view of the improved induction heating machine of the present invention.

Referring to the figures, FIG. 1 illustrates the improved induction heating apparatus 10 of the present invention for inductively heating a workpiece 12, such as an internal combustion engine valve seat so as to achieve hardening thereof. Inductive heating apparatus 10 comprises a slide 14 which is slidably mounted on a base 15 so as to be movable along the base in a rectilinear path to and from workpiece 12. A hydraulic cylinder 16 is coupled between the slide 14 and base 15 for reciprocating the slide to and from the workpiece. A stop 17 is fastened on the base along the path of slide travel to limit slide movement on the base in the direction of the workpiece.

Fastened on the top of slide 14 is a baseplate 18 which supports a frame 20 that is best illustrated in FIG. 2. Frame 20 carries a plurality of axially reciprocable electrode assemblies 22, the rearward end of one being illustrated in the cut away portion of FIG. 2. Each electrode assembly is parallel to and spaced apart from an adjacent electrode assembly. While the present induction hardening machine includes four electrode assemblies, those skilled in the art will recognize that the number of electrode assemblies carried by frame 20 will of course depend on the workpiece configuration. Each of the electrode assemblies 22 is identical in construction and therefore only one will be described in detail.

Returning to FIG. 1, each electrode assembly 22 is comprised of a quill 26 which is slidably supported for axial movement in the frame 20 by a pair of bearings 28 that are separated from each other by a spacer 30. The bearings 28 are urged against the ends of spacer 30 by bearing caps 32 secured at each end of frame 20.

Quill 26 has an axially extending bore 33 therethrough for receiving a shaft 34. The bore 33 is of sufficient diameter to allow limited pivotal movement of the shaft 34. To this end, the shaft 34 is supported at its forward end in the quill 26 by a spherical universal joint 36 having an inner ball portion 36a fixed to the shaft 34 which mates the inside hemispherical surfaces of two halves of a split spherical seat 36b which is disposed within an enlarged diameter portion 37 formed in the forward end of quill 26. With this arrangement the shaft 34 can pivot about the center of the sphere in any direction to produce a radial adjustment of the inductor 40 and its associated tip 44 for accommodating the position of the valve seat. Such radial adjustment is achieved by moving the tip 44 into engagement with the valve seat while the shaft 34 is free to pivot. Once the radial adjustment is achieved the spherical joint 36 is clamped by a hollow piston 38 for locking the shaft 34 in its pivotal position and thereby secure the tip 44 of the inductor 40 in its adjusted radial position in accurate alignemnt with the valve seat that it is operating on.

The piston 38 is retained in the forward portion of the quill 26 by a retainer 39 that is secured to the end of the quill. The shaft 34 extends through an axial bore in the piston 38 with the bore being of sufficient diameter so as not to interfere with the pivotal movement of the shaft. The outer diameter of the piston 38 is in engagement with the inner diameter of the retainer 39 and is slidable relative thereto.

The piston 38 includes a radial flange 43 that presents an annular face to which hydraulic pressure is applied for clamping the spherical joint 36. The hydraulic pressure is admitted through the port 42 into the space between the annular face of the flange 43 and the inner end of the retainer 39. The pressure forces the piston 38 to the right as viewed in FIG. 1 for acting against the left half of the split spherical seat 36b to clamp it against the ball portion 36a. Such action serves to lock the shaft 34 in its pivotal position to hold the tip 44 of the inductor 40 in its adjusted radial position.

The configuration of tip 44 of inductor 40 conforms to the configuration of the valve seats that are being hardened. Therefore, the time varying magnetic field, produced by the inductor upon energization with high frequency alternating current carried to the inductor through conductors 47a and 47b from high frequency alternating current source 48, is thus concentrated in the valve seat, causing an oppositely poled time varying magnetic field to be induced therein. The time varying magnetic field induced in the valve seat causes eddy currents to circulate in the valve seat which produces heating due to the high resistive losses encountered by the eddy currents.

To obtain optimum magnetic coupling between inductor tip 44 and workpiece 12, it is usually desirable that the tip 44 of inductor 40 be separated from workpiece 12 by a small but finite distance or air gap, typically 0.5–1.0 mm. In order to obtain the desired spacing between the inductor tip 44 and workpiece 12 to assure optimum magnetic coupling, apparatus 10 is provided with a novel positioning control system which includes a pair of vertically oriented plates 50a and 50b that are separated from each other by a plurality of pins 52 (as illustrated in FIG. 2). Each pin has a threaded end which extends through plate 50a for engagement with a complementary threaded bore in the rightwardmost end of a corresponding one of pins 54. The latter are threaded into frame 20 so as to be coaxial with an associated one of pins 52. Each of the pins 52 is secured at its rightward end to plate 50b by a separate one of bolts 55 (one of which is shown) which extend through plate 50b for threaded engagement in the bore of its associated pin 52.

A stepping motor 56 is secured to the rightward face of plate 50b with its shaft 58 extending through a bore in the plate coaxial with shaft 34 and quill 26. As best illustrated in FIG. 3, the stepping motor shaft 58 is in driving engagement with a lead screw 60. The latter is in threaded engagement with a nut 62 having a flanged end 63 disposed in an opening 64 in the rightward end of a "C" shaped tenon coupling 65 that is in threaded engagement with the rearward (rightward) end of shaft 34. A pin 66 (FIGS. 1 and 3) extends through a hole formed in the wall of the tenon coupling 65 and into a radially disposed hole in the end of shaft 34, for preventing the tenon coupling from becoming unthreaded from shaft 34.

The diameter of opening 64 in tenon coupling 65 is larger than the diameter of the lead nut flanged end 63. A plate 68 is secured to the rightward end of the tenon coupling 64 by bolts 70, and has a bore therethrough large enough to receive the body of nut 62 but smaller than the outer diameter of flange 63 so that there is but a limited degree of freedom between the nut and the tenon coupling.

Referring back to FIG. 1, tenon coupling 65 is urged rearwardly by spring 76 from a flange 74 circumscribing shaft 34 so as to bias the inductor shaft 34 rearwardly relative to the quill 26 so that the ball portion 36a mounted on the inductor shaft 34 is held against the right half of the split spherical seat 36b so there is no movement endwise of the inductor shaft 34 relative to the quill 26 when the piston 38 is released. Flange 74 is biased forwardly from plate 50a by a pair of springs 78a and 78b whose separate ends are each seated in a pocket in the flange and in the plate respectively. The springs 78a and 78b serve to urge the quill 26 and therefore the inductor shaft 34 forwardly but permit it to shift rearwardly against the spring pressure when the inductor 40 engages the workpiece 12.

When quill 26 is urged rearwardly, as will occur when the inductor tip 44 is moved into contact with workpiece 12, the coupling 65 will move rearwardly with it a like amount. As coupling 65 shifts rearwardly, its associated plate 68 moves away from the flange 63 of the nut 62 to create the gap "X" between the right face of the flange 63 as viewed in FIG. 1 and the left face of the plate 68. However, when stepping motor 56 is energized to thread lead screw 60 into nut 62 the latter is moved rearwardly to move the flange 63 toward the plate 68 to reduce the size of the gap which closes when the flange 63 contacts the plate 68. Further energization of the motor causes the coupling and hence the inductor to be moved rearwardly by the movement of the nut. By controlling the energization of motor 56 so that the nut 62 is displaced rearwardly by the gap distance "X" plus an additional distance, then the inductor will also be displaced rearwardly by an amount equal to the additional distance in excess of the distance "X".

Measurement of the gap distance "X" between plate 68 and the lead nut flange 63 is accomplished by a transducer 80 which, in the presently preferred embodiment, comprises a linear variable differntial transformer 80 secured to plate 68. Linear variable differential transformer 80, together with stepping motor 56, are coupled to a control apparatus 82, typicaly a programmable controller such as are well known in the art. A limit switch 83 mounted at the forward end of baseplate 18 is actuated by the rearward reciprocation of quill 26 following inductor tip contact with the workpiece. Actuation of the switch 83 is a signal that the inductor is in contact with the workpiece and programmable controller 82 then energizes stepping motor 56 in accordance with the output signal of linear variable differential transformer 80. Thus, the lead screw 60 is threaded into the nut 62 to displace the nut rearwardly by an amount equal to the gap distance "X" plus a predetermined distance equal to the desired spacing between the inductor tip 44 and the workpiece.

The induction heating apparatus 10 of the present invention operates to inductively heat the engine block valve seats as follows: First, slide 14 is displaced forwardly on base 15 to locate the inductor tip 44 of each electrode assembly 22 into a corresponding one of the valve seats of engine block 12. As a consequence of forward slide displacement, the inductor 40, the inductor shaft 34 and hence quill 26 of each electrode assembly 22 are displaced rearwardly relative to the frame so as to create the gap "X" between the plate 68 and flange 63 on nut 62. This rearward displacement of the quill actuates limit switch 83 to signal that inductor tip 44 is in contact with the workpiece. In response to the actuation of limit switch 83, hydraulic fluid is admitted into fluid port 42 to bias piston 38 against split spherical seat 36b to lock the inductor shaft 34 to quill 26. Following locking of inductor shaft 34 to quill 26, motor 56 is energized by programmable controller 82 to thread lead screw 60 into nut 62 to displace the nut. The displacement is equal to the size of the gap as sensed by transformer 80, plus a predetermined distance which is equal to the desired separation between the inductor tip and the workpiece so that the inductor shaft is displaced rearwardly by this predetermined distance. Reciprocating the inductor shaft rearwardly by the predetermined distance results in the inductor tip being spaced from the workpiece by the predetermined distance. Once the inductor tip is spaced from the workpiece by the predetermined gap distance, the inductor is energized to heat the valve seat.

The foregoing describes an improved induction heating machine having an improved positioning control apparatus for insuring optimal spacing between the inductor and the workpiece during the heating process.

Although the illustrative embodiment of the invention has been described in considerable detail for the purpose of fully disclosing a practical operative structure incorporating the invention, it is to be understood that the particular apparatus shown and described is intended to be illustrative only and that various novel features of the invention may be incorporated in other structural forms without departing from the spirit and scope of the invention as defined in the subjoined claims.

I claim:

1. An induction heating apparatus comprising a base, a slide mounted on said base for movement in an axial path of travel toward and away from the workpiece to be heated, an inductor supported by said slide for axial movement relative to said slide, biasing means urging said inductor forwardly on said slide, actuator means, coupling means including first and second coupling members connected respectively to said actuator means and said inductor and releasably engaged by said bias means, said first and second members when engaged arranged to couple said inductor to said actuator means so that energization of said actuator means will produce axial movement of said inductor relative to said slide only in a direction away from said workpiece, means for moving said slide in a direction to move said inductor into engagement with the workpiece and shift said inductor relative to said slide against said biasing means to thereby disengage said coupling means first and second members, measuring means connected to measure the extent of relative motion between said first and second members and generate a signal corresponding thereto, control means connected to receive said signal from said measuring means and energize said actuator means for moving said coupling means first member so as to reengage said first and second members and then move said first and second members and inductor an additional distance for moving said inductor a predetermined amount to space it the desired distance from the workpiece.

2. An induction heating apparatus according to claim 1 further including radial locking means and an inductor shaft, and wherein said inductor shaft is received at one end in said radial locking means to be pivotably supported by said slide so that the inductor can adjust radially as it contacts the workpiece to make accurate engagement with the area to be heated, said radial locking means including clamping means for clamping said shaft in the pivotally adjusted position during the heating process.

3. An induction heating apparatus according to claim 1 including a quill carried by said slide for limited axial movement relative to said slide, said quill having an axial bore, a shaft supported in the bore of said quill for axial movement in unison with said quill, and said inductor is mounted on the end of said shaft exteriorly of said quill for engagement with the workpiece with the opposite end of said shaft being connected to said coupling means second member.

4. An induction heating apparatus according to claim 3 wherein said inductor is of a conical configuration for heating the conical surface of a valve seat, and including a radial locking means mounting said inductor shaft in said quill to permit radial adjustment of said inductor as it enters the conical opening of said valve seat, and clamping means for clamping said shaft in the radially adjusted position during the heating process.

5. An induction heating apparatus (10) comprising a base (15), a slide (14) mounted on said base for movement in a path of travel toward and away from the workpiece (12) to be heated, an inductor (44), an inductor shaft (34) fixed to said inductor and supported by said slide for axial movement relative to said slide towards and away from said workpiece, biasing means (78a 78b) urging said inductor shaft forwardly on said slide towards a workpiece actuator means having an output member (58,60) and adapted to be energized to cause movement of said output member, coupling means (65) arranged to couple said inductor shaft to said actuator means output member (58,60), said coupling means including a first member (63) drivingly engaged with said actuator output member so as to be located in a fixed but variable axial position determined by said movement of said actuator means output member, and a second member (65) secured to said inductor shaft, said first and second members including normally engaging portions (68,69) urged into axial engagement with each other by said biasing means while accomodating relative axial movement between said inductor shaft and said slide against the action of said bias means caused by said inductor contacting a workpiece and continued slide movement towards said workpiece and enabling axial movement of said inductor shaft against the action of said bias means by axial movement of said first coupling means member so that energization of said actuator means will produce axial movement of said inductor shaft and inductor away from said workpiece, means for moving said slide in a direction to move said inductor into engagement with the workpiece and shift said inductor shaft axially relative to said slide against the action of said biasing means to thereby disengage said coupling first and second members to create a gap betwen said normally engaging portions of said first and second members, measuring means connected to detect the extent of relative axial movement between said first and second coupling members and generate signals corresponding to said gap, and control means (82) responsive to signals generated by said measuring means to energize said actuator means to move said first coupling member so as to eliminate said gap and an additional distance to move said inductor a predetermined amount to be spaced a predetermined air gap distance from the workpiece.

6. The apparatus according to claim 5 wherein said actuator means is a stepping motor having a rotary output member and wherein said first coupling member is threadably engaged with said first coupling member to produce said axial movement thereof upon energization of said stepping motor.

7. The apparatus according to claim 6 wherein said coupling means first member portion comprises a flange member and said second member comprises a plate, with said measuring means comprising a transducer affixed to one of said flange or said plate and having a probe engaging the other of flange or said plate to generate electrical output signals corresponding to relative movement therebetween.

8. The apparatus according to claim 5 further includes a quill mounted on said slide and having an axial bore formed therein extending along and within said bore, further including a selectively operated radial locking assembly located at the end of said quill adjacent said workpiece, selectively locking said inductor shaft radially to said quill.

9. The apparatus according to claim 8 wherein said radial locking assembly comprises a split hemispherical seat receiving said inductor shaft and a selectively movably piston in engagement therewith carried in a fluid pressure chamber in said quill and locking said seat to said inductor shaft upon pressurization of said fluid pressure chamber.

* * * * *